United States Patent Office 3,480,587
Patented Nov. 25, 1969

3,480,587
POLYESTER PREPARATION
Kenneth Porter, Harrogate, England, assignor to Imperial Chemical Industries Limited, London, England, a corporation of Great Britain
No Drawing. Filed Apr. 17, 1967, Ser. No. 631,177
Claims priority, application Great Britain, Apr. 22, 1966, 17,728/66
Int. Cl. C08g 17/003
U.S. Cl. 260—47         4 Claims

ABSTRACT OF THE DISCLOSURE

Production of polyesters and copolyesters with at least a part of the polycondensation carried out under conditions of turbannular flow with inert gas driving medium.

---

The present invention relates to the preparation of high molecular weight linear polyesters and copolyesters, more particularly to a continuous process for carrying out at least a part of the polycondensation stage of such preparation.

According to the present invention we provide a process for the preparation of a fibre- or film-forming polyester of copolyester wherein a bis($\omega$-hydroxyalkyl)dicarboxylate is subjected to polycondensation optionally with the addition initially or during the polycondensation of a second bis($\omega$-hydroxyalkyl)dicarboxylate or its oligomer, a dicarboxylic acid, a hydroxy carboxylic acid or a glycol, polycondensation being continued until a fibre or film-forming polyester or copolyester is produced, at least a portion of the polycondensation reaction being carried out while the reaction mixture in liquid state is caused to move along a long narrow tube in a state of turbannular flow by the continuous movement past the liquid of a gaseous fluid chemically inert towards the polyester or copolyester, the rate of flow of the gaseous fluid past the liquid reaction mixture being such as to ensure that during at least part of the residence time of the reaction mixture in the tube the partial pressure of glycol in the gaseous fluid is below the equilibrium partial pressure for the reaction mixture with which it is in contact.

The process of our invention is suitable for the preparation of fibre-forming polyesters which may be prepared by the reaction of a dicarboxylic acid with a glycol, and copolyesters which may be prepared by the reaction of a mixture of two dicarboxylic acids with at least one glycol or of two glycols with at least one dicarboxylic acid or of one dicarboxylic acid, one glycol and a hydroxymonocarboxylic acid.

In order that the process of our invention may result in the preparation of fibre-forming polyesters or copolyesters, it is necessary that a high proportion of the repeating units of the polymer molecules should be based on a linear aromatic dicarboxylic acid and a linear glycol. By high proportion we mean above about 85 percent. Examples of suitable linear aromatic dicarboxylic acids are terephthalic acid and bis-1:2-(paracarboxyphenoxy) ethane; Examples of suitable glycols of those of the formula $HO(CH_2)_nOH$, wherein $n$ is not less than 2 and not greater than 10, and bis-1:4-hydroxymethyl cyclohexane.

In the term alkyl we include cycloalkyl.

By the term oligomer, we mean a polymer of molecular weight lower than will confer on the polymer the properties required for fibre-formation. In the term oligomer, we also include a mixture of oligomers. A suitable mixture may, for example, result from the reaction of a low aliphatic diester of a dicarboxylic acid with a glycol under ester-interchange conditions.

By the term narrow as applied to the tube, we mean of such dimensions as to favour turbannular flow. Preferably the ratio (Sectional area of tube divided by length of the wetted perimeter) should be less than 2.5 cm. Turbannular flow is a well-known concept which may briefly be described as progression along a tube in liquid form roughly in the form of an annulus in contact with the walls of the tube with constantly changing wave formation on the inner surface of the annular stream of liquid. We do not however, exclude a small degree of bridging across the tube by the reaction mixture.

In general the conditions required for the establishment and maintenance of turbannular flow in the narrow tube of our invention are little dependent on the properties of the liquid and of the gaseous fluid. The required conditions for any particular apparatus can therefore easily be ascertained by introducing the reactant at the required rate at the start of the tube, which is maintained at the required reaction temperature, and injecting gas at the start of the tube at a progressively increasing rate until the conditions of turbannular flow are seen to be established. The criterion depends on the fact that when turbannular flow is not established the liquid flows in slugs and the gas flow fluctuates, and a clean separation of gas and liquid cannot be established at the exit end of the tube, whereas when turbannular flow is established gas substantially free from polymer can be bled off from the centre line at the end of the tube and liquid alone tapped off from the peripheral region at the end of the tube.

Under the conditions of turbannular flow the flow of gaseous fluid is concurrent to the flow of liquid reactant, but there is a high rate of relative movement between the gas/liquid surface of the liquid and the gas. Additionally, the liquid layer is maintained at small thickness. This combination of conditions is thought to be the cause of the high rate of polyesterification observed under the conditions of our invention, since transport of glycol resulting from reaction to the liquid/gas interface and its transfer to the gas phase is facilitated.

While we include in the ambit of our invention the carrying out of the whole of the polycondensation stage from the initial bis($\omega$-hydroxyalkyl) dicarboxylate to a high molecular weight polymer such as would, for example, have a viscosity ratio of 2.6 as measured in 1% solution in orthochlorophenol at 25° C., it is of particular utility to use the process of our invention to carry out that portion of the polycondensation stage from when the reaction mixture consists of a product having average degree of polymerisation 27 to when the molecular weight is such that the viscosity ratio, measured as hereinbefore described, is above about 1.7 and not above about 2.0. The reason for this choice of the starting point is that in the early stages of polycondensation of bis($\omega$-hydroxyalkyl) terephthalate the partial pressure of glycol above the reaction mixture at the level of temperature at which this reaction is normally carried out, and preferably from about 280 to about 320° C., is high due to the fact that the polycondensation with elimination of glycol proceeds with facility. It is necessary, therefore, at this stage to provide a high rate of flow of gaseous fluid in order to maintain the partial pressure of glycol at a suitable low level, otherwise the advantages of operation under the conditions of our invention tend to be nullified. The reason for the choice of the finishing point, that is the upper range of molecular weight, is that on the one hand a polyester or copolyester of viscosity ratio 1.7 may be the required end product and on the other hand with a polyester or copolyester of viscosity ratio greater than 2.0 the melt viscosity is so high as to cause operational difficulties.

The reactant or reactants may conveniently be pumped into the tube in liquid form near to the beginning of the tube, the gaseous fluid being introduced at the beginning of the tube, although any other arrangement may be used which produces the desired result as described hereinbefore. An example of such other method is the introduction of the reactant or reactants in finely divided form dispersed in a suitable liquid. In the case where the gaseous fluid may conveniently be liquefied, that liquid may be used as that in which the reactant or reactants is or are dispersed. The liquid in which the reactant or reactants is or are dispersed may also be a suitable glycol, which in the case of preparation of the homopolyester would be the glycol from which the reactant was prepared or derived.

The tube should be of such length as to permit the required residence time under the reaction conditions pertaining. The tube need not be straight and need not be of the same bore throughout; the bore of the tube may, for example, increase with progression towards the exit. The tube should be of material chemically inert towards the reaction mixture, at least where contact with the reaction mixture takes place; it may, for example, be of stainless steel.

Additives which are required to be present in the final polyester or copolyester may be introduced at any convenient point along the tube. In so far as such additives are conveniently incorporated in the initial reactants or introduced in the form of a slurry in a suitable glycol, the additives will be introduced in the initial stages of the tube.

For example, titanium dioxide delustrant or stabilizers against thermal degradation would be conveniently introduced into the tube at an early stage. On the other hand when an additive, for example, a stabilizer or end-group modifier, is required to be present only from the point of view of subsequent processing of the fibre-forming polyester or copolyester, it may be introduced into the tube in the latter stages, albeit in such a manner as to result in a satisfactory degree of uniformity.

Examples of suitable gaseous fluids are nitrogen, which should contain no more than a small amount of oxygen, and trichlorotrifluoro-ethane. Whilst the gaseous fluid should be chemically inert, small amounts of chemical modifiers may, if required, be present in the gaseous fluid. Such chemical modifiers may be substances which react with carboxyl end groups with the object of reducing the number of carboxyl end groups. Examples of such substances are diazomethane and ethylene oxide.

The gaseous fluid may either be injected at one point or at more than one point. The use of more than one injection point will permit the establishment of high mass flow of gas in the later stages of the tube; this may be desirable, for example, when the diameter of the tube is greater in the later stages.

In order that the process of our invention may be the more fully understood, we give hereinafter some specific examples of methods in which our invention may be put into practice.

Example 1

The tube used in the reaction consisted of a first stage of about 15 metres length and 2.4 mms. internal diameter and a second stage of about 7.5 metres length and 6.6 mms. internal diameter. Throughout the reaction the coil temperature was maintained at 286° C.

A mixture of poly(ethylene terephthalate) oligomers was prepared by the reaction under ester-interchange conditions of dimethyl terephthalate with ethylene glycol, using as catalyst manganous acetate (0.05 percent by weight based on the dimethyl terephthalate), addition of phosphorous acid (0.037 percent by weight based on the dimethyl terephthalate) and antimony trioxide (0.04 percent by weight based on the dimethyl terephthalate) and continuing the reaction under polycondensation conditions. The product was ground to pass a 200 BSS mesh screen. The viscosity ratio of the powder as measured in 1 percent solution in orthochlorophenol at 25° C., was 1.26.

The powdered mixture of oligomers was slurried with 9 times its weight of trichlorotrifluoroethane and fed, at a rate corresponding to a feed of 90 g. of oligomer mixture per hour, into the pressure-tight tube. The oligomer slurry was fed into the narrower bore tube at the point most distant from its junction with the wider bore tube, pressure also being measured at that point. The pressure rose rapidly to 26½ atmosphere above atmospheric pressure and was thereafter maintained thereat by release from the end of the wider bore tube of gas and liquid. The liquid solidified on cooling and was found to be a poly(ethylene terephthalate) of viscosity ratio 1.35 measured as described hereinbefore, that is a fibre-forming poly(ethylene terephthalate).

Example 2

Example 1 was repeated with the sole distinction that the mixture fed into the tube consisted of powdered oligomer (5 parts by weight), trichlorotrifluoroethane (95 parts by weight) and the eutectic mixture of diphenyl and diphenyl oxide (26.5% by weight of diphenyl) (10 parts by weight). The liquid which issued from the end of the tube was found to be a poly(ethylene terephthalate of viscosity ratio 3.35, measured as described in Example 1.

Examples 3 and 4

These examples demonstrate conditions under which turbannular flow is established. Poly(ethylene terephthalate) (PET) was pumped in the molten state into the feed end of a tube at 0.29 pound per hour and nitrogen was injected also at the feed end of the tube. The rates shown in Table 1 are those at which turbannular flow was established as judged by the discontinuation of wide fluctuation in the flow of gas from the exit of the tube. At flows of gas above the critical flow rate, a steady flow of liquid PET was obtained from the exit of the tube and gas substantially free from liquid was obtained from an exit on the centre line of the tube at the exit end.

TABLE 1

| Example | Tube internal diameter (mm.) | Tube length (cm.) | Flow of nitrogen at transition to turbannular flow— litres per minute at 1 atmosphere and 25° C. |
| --- | --- | --- | --- |
| 3 | 9.25 | 175 | 8.5 |
| 4 | 6.35 | 254 } | 5 |
|   | 9.25 | 175 } |   |

In Example 4 the tube consisted of two sections, the first mentioned feeding into the second mentioned.

Examples 5–19

A mixture of oligomers was prepared as described in Example 1, but the product instead of being ground was fed into the reaction tube in the molten state. Nitrogen was used as the gaseous fluid. The tube used was of stainless steel and was completely immersed in a hot air circulation system which maintained its temperature approximately uniform throughout. A preheater system for the nitrogen was also immersed in the hot air circulation system whereby the nitrogen was preheated to the same temperature as the tube.

The conditions of reaction and the viscosity ratio (V.R.) for the product, as measured in dichloroacetic acid at 1% concentration at 25° C. and the equivalent intrinsic viscosity (I.V.) as measured at 1% concentration in orthochlorophenol at 25° C. are given in Table 2.

TABLE 2

| Example | Length of tube, cm. | Internal diameter of tube, mm. | I.V. of mixture fed | Feed rate, g./hr. | Nitrogen feed, litres per min. | Pressure drop, Ats. | Average temp., °C. | Product V.R. | Product I.V. |
|---|---|---|---|---|---|---|---|---|---|
| 5 | 290 | 6.35 | 0.29 | 131 | 27.2 | 2.72 | 292 | 1.814 | 0.63 |
| 6 | 290 | 6.35 | 0.29 | 270 | 27.2 | 2.38 | 308 | 1.662 | 0.52 |
| 7 | 290 | 6.35 | 0.29 | 630 | 27.2 | 2.38 | 291 | 1.478 | 0.39 |
| 8 | 290 | 6.35 | 0.24 | 131 | 28.0 | 0.7 | 312 | 1.780 | 0.61 |
| 9 | 290 | 6.35 | 0.24 | 270 | 18.0 | 0.7 | 315 | 1.581 | 0.47 |
| 10 | 290 | 6.35 | 0.24 | 630 | 18.0 | 0.7 | 298 | 1.382 | 0.32 |
| 11 | 145 | 9.25 | 0.24 | 131 | 36.8 | 0.7 | 315 | 1.714 | 0.56 |
| 12 | 145 | 9.25 | 0.24 | 426 | 6.0 | 0.7 | 304 | 1.361 | 0.30 |
| 13 | 46 | 6.35 | 0.24 | 426 | 56.5 | 0.7 | 307 | 1.344 | 0.29 |
| 14 | 46 | 6.35 | 0.24 | 131 | 28.3 | 0.7 | 313 | 1.596 | 0.47 |
| 15 | 175 | 3.3 | 0.29 | 131 | 9.06 | 3.06 | 292 | 1.499 | 0.40 |
| 16 | 175 | 3.3 | 0.29 | 131 | 27.2 | 7.15 | 320 | 1.666 | 0.52 |
| 17 | 175 | 3.3 | 0.29 | 270 | 27.2 | 9.2 | 301 | 1.536 | 0.43 |
| 18 | 175 | 3.3 | 0.29 | 270 | 27.2 | 7.15 | 309 | 1.499 | 0.40 |
| 19 | 175 | 3.3 | 0.29 | 630 | 27.2 | 9.2 | 319 | 1.476 | 0.39 |

Examples 20, 21 and 22

Three further experiments were carried out similarly to Examples 5 to 14 but using trichlorotrifluoroethane (T.T.E.) in place of nitrogen as the gaseous fluid. The results are given in Table 3.

TABLE 3

| Example | Length of tube, cm. | Internal diameter of tube, mm. | I.V. of mixture fed | Feed rate, g./hr. | T.T.E. feed, g./hr. | Pressure drop, Ats. | Average temp., °C. | Product V.R. | Product I.V. |
|---|---|---|---|---|---|---|---|---|---|
| 20 | 51 | 6.35 | 0.24 | 131 | 1,405 | 0.7 | 290 | 1.389 | 0.32 |
| 21 | 51 | 6.35 | 0.24 | 131 | 1,405 | 0.7 | 289 | 1.387 | 0.32 |
| 22 | 51 | 6.35 | 0.24 | 131 | 7,030 | 0.7 | 254 | 1.439 | 0.36 |

Examples 23 to 27

Five further experiments were carried out using the reactor and conditions of Example 4 except that the nitrogen flow was varied. The results, given in Table 4, illustrate the substantial increase in V.R. which occurs as the turbannular flow region is approached and entered.

TABLE 4

| Example | Nitrogen feed rate, litres/ minute | Pressure drop, Ats. | Average temp., °C. | Product V.R. | Product I.V. |
|---|---|---|---|---|---|
| 23 [1] | 2 | 0.2 | 295 | 1.580 | 0.46 |
| 24 [2] | 4.5 | 0.88 | 295 | 1.756 | 0.59 |
| 25 | 9.0 | 1.22 | 295 | 1.820 | 0.64 |
| 26 | 18.1 | 1.77 | 295 | 1.853 | 0.66 |
| 27 | 27.2 | 2.25 | 295 | 1.858 | 0.66 |

[1] Nitrogen feed rate and pressure drop fluctuated rapidly during this experiment.
[2] Some fluctuation of nitrogen feed rate was observed during this experiment.

What we claim is:

1. A process for the preparation of a fibre- or film-forming polyester or copolyester wherein at least one bis(ω-hydroxyalkyl) dicarboxylate derived from a dicarboxylic acid selected from the group consisting of terephthalic acid and bis-1:2-(paracarboxyphenoxy)ethane and a glycol selected from the group consisting of $$HO(CH_2)_nOH$$

where $n$ is 2–10 and bis-1:4-hydroxymethyl cyclohexane is subjected to polycondensation until a fibre- or film-forming polyester or copolyester is produced, at least a portion of the polycondensation reaction being carried out while the reaction mixture in liquid state is caused to move along a long narrow tube in a state of turbannular flow by continuous movement past the liquid reaction mixture of a gaseous fluid chemically inert towards the polyester or copolyester, the rate of flow of the gaseous fluid past the liquid reaction mixture being such as to ensure that during at least part of the residence time of the reaction mixture in the tube the partial pressure of glycol in the gaseous fluid in contact with the reaction mixture is below the equilibrium partial pressure for the reaction mixture with which it is in contact.

2. A process according to claim 1 wherein the reaction mixture entering the tube is of average degree of polymerisation 27 and the product issuing from the tube is of viscosity ratio above 1.7, measured as hereinbefore described, and not above 2.0.

3. A process according to claim 1 wherein the dimensions of the tube are such that sectional area of the tube divided by the length of the wetted perimeter is less than 2.5 cm.

4. A process according to claim 1 wherein the bis(ω-hydroxyalkyl)dicarboxylate is bis(β-hydroxyethyl)dicarboxylate.

References Cited

UNITED STATES PATENTS

| 2,973,341 | 2/1961 | Hippe et al. | 260—75 |
| 3,167,531 | 1/1965 | Parker et al. | 260—75 |
| 3,192,184 | 6/1965 | Brill et al. | 260—75 |
| 3,241,926 | 3/1966 | Parker et al. | 23—283 |
| 3,359,074 | 12/1967 | Dobo | 23—283 |

FOREIGN PATENTS 1,001,429  8/1965  Great Britain.

WILLIAM H. SHORT, Primary Examiner

MELVIN GOLDSTEIN, Assistant Examiner

U.S. Cl. X.R.

260—75